US010670335B2

(12) United States Patent
Funayama et al.

(10) Patent No.: US 10,670,335 B2
(45) Date of Patent: Jun. 2, 2020

(54) METHOD AND APPARATUS FOR MANUFACTURING ENAMELED WIRE

(71) Applicant: Hitachi Metals, Ltd., Tokyo (JP)

(72) Inventors: Yasuhiro Funayama, Naka-gun (JP); Ken Omori, Hitachi (JP); Shunichiro Sato, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 553 days.

(21) Appl. No.: 14/696,394

(22) Filed: Apr. 25, 2015

(65) Prior Publication Data

US 2016/0033199 A1 Feb. 4, 2016

(30) Foreign Application Priority Data

Jul. 29, 2014 (JP) ................................ 2014-154327

(51) Int. Cl.

| | |
|---|---|
| ***C08J 7/18*** | (2006.01) |
| ***F26B 3/30*** | (2006.01) |
| ***H01B 13/06*** | (2006.01) |
| ***F26B 13/00*** | (2006.01) |
| ***B05D 3/02*** | (2006.01) |
| ***B05D 3/06*** | (2006.01) |
| *H01B 13/00* | (2006.01) |

(52) U.S. Cl.

CPC .............. *F26B 3/30* (2013.01); *B05D 3/0209* (2013.01); *B05D 3/0263* (2013.01); *B05D 3/067* (2013.01); *F26B 13/002* (2013.01); *H01B 13/065* (2013.01); *H01B 13/003* (2013.01)

(58) Field of Classification Search

CPC ...... B05D 3/209; B05D 3/0263; B05D 3/067; F26B 3/28; F26B 3/283; F26B 3/30; F26B 13/002; H01B 13/003; H01B 13/065

USPC ....... 427/510, 513, 521, 542, 553, 554, 557, 427/558, 559, 117–120

See application file for complete search history.

(56) References Cited

U.S. PATENT DOCUMENTS 1,998,615 A * 4/1935 Groven .................... F26B 3/30 310/45
2,279,771 A * 4/1942 Austin .................... B05D 7/20 427/120
2,302,332 A * 11/1942 Leekley .................. B05D 7/06 36/43

(Continued)

FOREIGN PATENT DOCUMENTS

JP S53-019584 A 2/1978
JP 10-289625 A 10/1998

(Continued)

OTHER PUBLICATIONS

Julius Grant, editor; Hackh's Chemical Dictionary, 3rd edition; McGraw-Hill Book Company,Inc.; New York; 1944 (no month), excerpt p. 305.*

(Continued)

*Primary Examiner* — Marianne L Padgett
(74) *Attorney, Agent, or Firm* — McGinn I.P. Law Group, PLLC

(57) ABSTRACT

A method for manufacturing an enameled wire includes providing a conductor with an enamel coating thereon, and exposing the conductor to a light with a wavelength absorbable by a solvent included in the enamel coating to evaporate the solvent. The light includes a peak wavelength of less than 4 μm.

6 Claims, 4 Drawing Sheets

(56) References Cited

U.S. PATENT DOCUMENTS

| | | | | | |
|---|---|---|---|---|---|
| 2,632,211 | A * | 3/1953 | Trigg | H01B 3/485 | 174/521 |
| 3,179,630 | A * | 4/1965 | Endrey | C08G 73/1007 | 525/436 |
| 3,183,604 | A * | 5/1965 | Stauffer | B05D 3/0263 | 34/421 |
| 3,423,431 | A * | 1/1969 | Starr | C07D 307/93 | 204/157.69 |
| 3,607,507 | A * | 9/1971 | Enos | B65H 69/02 | 156/157 |
| 3,634,304 | A * | 1/1972 | Suzuki | C08G 18/4081 | 524/323 |
| 4,342,794 | A * | 8/1982 | Volker | B05D 7/20 | 118/405 |
| 4,594,266 | A * | 6/1986 | Lemaire | B05D 3/02 | 118/50.1 |
| 4,738,868 | A * | 4/1988 | Fischer | B29B 15/125 | 427/554 |
| 5,518,779 | A * | 5/1996 | Yu | B05D 3/0263 | 427/171 |
| 6,858,261 | B1 * | 2/2005 | Bar | B05D 3/0263 | 118/642 |
| 8,197,907 | B2 * | 6/2012 | Dibon | B05D 3/0263 | 118/400 |
| 8,629,352 | B2 * | 1/2014 | Ando | H01B 3/006 | 174/110 A |
| 8,642,179 | B2 * | 2/2014 | Nabeshima | C08G 18/346 | 427/120 |
| 8,802,231 | B2 * | 8/2014 | Funayama | C09D 179/08 | 428/379 |
| 8,986,834 | B2 * | 3/2015 | Kikuchi | C08G 73/10 | 174/110 R |
| 2003/0172828 | A1 * | 9/2003 | Tabuchi | B41C 1/1008 | 101/463.1 |
| 2005/0025976 | A1 * | 2/2005 | Faris | C08L 79/08 | 428/411.1 |
| 2006/0105185 | A1 * | 5/2006 | Hwang | C08G 73/1007 | 428/473.5 |
| 2006/0281334 | A1 * | 12/2006 | Shin | C09D 11/30 | 438/780 |
| 2008/0220180 | A1 * | 9/2008 | Bar | B05C 1/0826 | 427/542 |
| 2008/0292815 | A1 * | 11/2008 | Iwata | B05D 3/0254 | 427/595 |
| 2011/0024043 | A1 * | 2/2011 | Boock | A61B 5/14532 | 156/345.24 |
| 2011/0024156 | A1 * | 2/2011 | Ando | H01B 3/006 | 174/110 SR |
| 2011/0131829 | A1 * | 6/2011 | Zagar | B41F 23/0413 | 34/274 |
| 2011/0143207 | A1 * | 6/2011 | Arora | H01M 2/162 | 429/231.3 |
| 2011/0159208 | A1 * | 6/2011 | Price | B44C 5/0469 | 427/557 |
| 2011/0198109 | A1 * | 8/2011 | Nabeshima | C08G 18/346 | 174/120 C |
| 2012/0048592 | A1 * | 3/2012 | Kikuchi | C08G 73/10 | 174/110 SR |
| 2012/0207999 | A1 * | 8/2012 | Ohya | C08J 5/18 | 428/220 |
| 2012/0241191 | A1 * | 9/2012 | Funayama | C09D 179/08 | 174/119 C |
| 2012/0328272 | A1 * | 12/2012 | Fujita | F26B 3/30 | 392/416 |
| 2012/0329935 | A1 * | 12/2012 | Matsumura | C09D 5/32 | 524/434 |
| 2013/0219738 | A1 * | 8/2013 | Fujita | B05D 3/0263 | 34/267 |
| 2015/0047217 | A1 * | 2/2015 | Goldstein | F26B 3/30 | 34/245 |
| 2017/0355829 | A1 * | 12/2017 | Sakaguchi | B01J 13/0091 | |
| 2019/0127643 | A1 * | 5/2019 | Koseki | C09K 19/56 | |
| 2019/0307371 | A1 * | 10/2019 | Boock | A61B 5/14532 | |

FOREIGN PATENT DOCUMENTS

| | | | | | |
|---|---|---|---|---|---|
| JP | 2006-213793 | A | * | 8/2006 | C08G 73/06 |
| JP | 2012-252868 | A | | 12/2012 | |
| JP | 2012-252870 | A | | 12/2012 | |

OTHER PUBLICATIONS

Richard J Lewis, Sr., editor; Hawley's Condensed Chemical Dictionary, 12th edition; Van Nostrand Reinhold company; New York; 1993 (no month), excerpt 462.*

S.P.Pappas, editor; UV Curing: Science and Technology; "Light Sources" by Vincent D McGinnis, pp. 97-129; technology marketing Corporation; 624 Westover Rd., Stamford, CT, USA; 1978 (no month).*

NIST chemistry webbook (webbook.NIST.gov), SRD 69; 2-Pyrrolidinone, 1-methyl; IR spectrum, retrieved Apr. 23, 2018.*

NIST chemistry webbook (webbook.NIST.gov), SRD 69; N,N-Dimethylacetamide; IR spectrum, retrieved Apr. 23, 2018.*

Screenshot taken Nov. 25, 2019 from //webbook.nist.gov/cgi/cbook.cgi?ID=C127195&Type=IR-SPEC&Index=2; complete enlargement of graph from NIST Chemistry WebBook, SRD 69, previously cited on PTO-892 of Apr. 24, 2018.*

RJ Lewis, Sr., editor; Hawley's Condensed Chemical Dictionary, 12th edition; Van Nostrand Reinhold Company, New York; 1993 (no month); excerpts pp. 52, 630, 930 & 935.*

Petr Sysel et al.; "Structure-Curing Relation for Polyamic Acids"; Eur. Polym. Journal; vol. 32, No. 3, pp. 317-320; 1996 (no month).*

Japanese Office Action dated Sep. 26, 2017 in Japanese Application No. 2014-154327 with an English translation thereof.

Japanese Office Action, dated Sep. 28, 2018, in Japanese Application No. 2017-247126 and English Translation thereof.

"Features of Infrared light heating using Halogen heater and its application", by Yukio Ueshima, Light Edge, Japan, Jun. 2013, No. 39, p. 10-p. 19 and partial English translation thereof, (Section 5.2+ figure 10).

* cited by examiner

METHOD AND APPARATUS FOR MANUFACTURING ENAMELED WIRE

The present application is based on Japanese patent application No. 2014-154327 filed on Jul. 29, 2014, the entire contents of which are incorporated herein by reference.

BACKGROUND OF THE INVENTION

1. Field of the Invention

The invention relates to method and apparatus for manufacturing an enameled wire.

2. Description of the Related Art

Enameled wires are generally manufactured by conducting a step of evaporating a solvent contained in an enamel coating applied to a conductor to dry the enamel coating and a step of curing a resin contained in the enamel coating and baking it to form a film on the conductor. Conventionally, the steps are performed in one apparatus.

A method of evaporating the solvent to dry the enamel coating is known in which the enamel coating is heated by hot air, induction heating or infrared light etc. (see, e.g., JP-A-2012-252868, paragraph 0052).

SUMMARY OF THE INVENTION

In forming the film on the outer periphery of the conductor in a short time by the conventional method, however, a problem may arise that a wave pattern is formed on a surface of the dried enamel coating, or a problem may arise that only the surface of the enamel coating is dried (so-called skinning), resulting in that the solvent remains inside without evaporating such that the remained solvent causes a foaming in the film. Thus, it is necessary to take time to evaporate the solvent to dry the enamel coating in order to form a film with good appearance on the outer periphery of the conductor.

It is an object of the invention to provide a method for manufacturing an enameled wire that allows the film on the conductor to be formed with good appearance even when evaporating the solvent contained in the enamel coating in a short time to dry the enamel coating, as well as an apparatus for manufacturing the enameled wire.

(1) According to one embodiment of the invention, a method for manufacturing an enameled wire comprises:

providing a conductor with an enamel coating thereon; and exposing the conductor to a light with a wavelength absorbable by a solvent included in the enamel coating to evaporate the solvent, wherein the light comprises a peak wavelength of less than 4 μm.

In the above embodiment (1) of the invention, the following modifications and changes can be made.

(i) The peak wavelength is in a range of 2.0 to 3.2 μm.

(ii) The light is unabsorbable by a solute included in the enamel coating.

(iii) The light comprises a near-infrared light.

(iv) The light comprises a laser light.

(2) According to another embodiment of the invention, an apparatus for manufacturing an enameled wire comprises a baking furnace comprising an irradiation unit that irradiates light with a peak wavelength of less than 4 μm onto a travelling conductor with an enamel coating thereon.

In the above embodiment (2) of the invention, the following modifications and changes can be made.

(v) The baking furnace comprises an evaporation oven with the irradiation unit and a curing oven separate from the evaporation oven.

Effects of the Invention

According to one embodiment of the invention, a method for manufacturing an enameled wire can be provided that allows the film on the conductor to be formed with good appearance even when evaporating the solvent contained in the enamel coating in a short time to dry the enamel coating, as well as an apparatus for manufacturing the enameled wire.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

Method of Manufacturing Enameled Wire

The method of manufacturing an enameled wire in the embodiment of the invention includes providing a conductor with an enamel coating thereon, and exposing the conductor to a light with a wavelength absorbable by a solvent included in the enamel coating to evaporate the solvent, wherein the light includes a peak wavelength of less than 4 μm.

Figure 1:
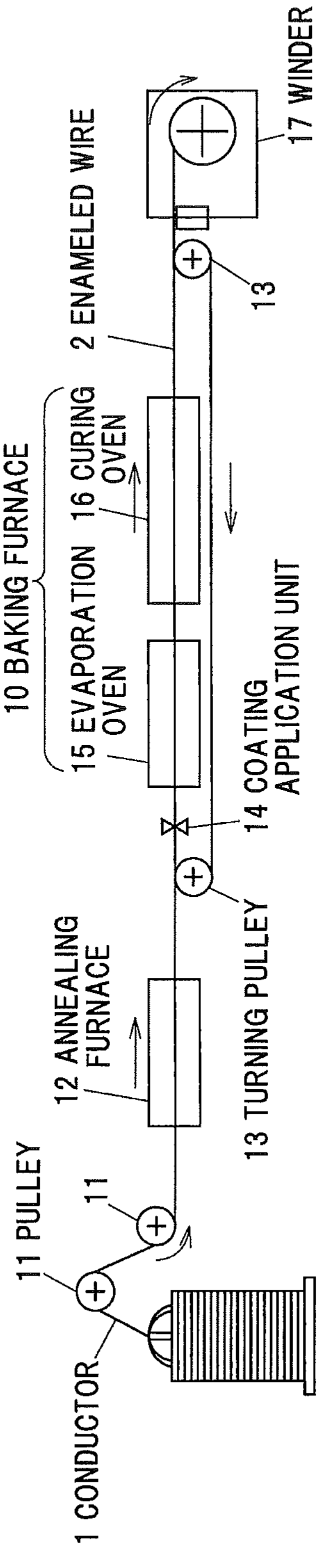
FIG. 1 is an illustration diagram showing an example of an apparatus for manufacturing an enameled wire in an embodiment of the present invention.
Figure 2:
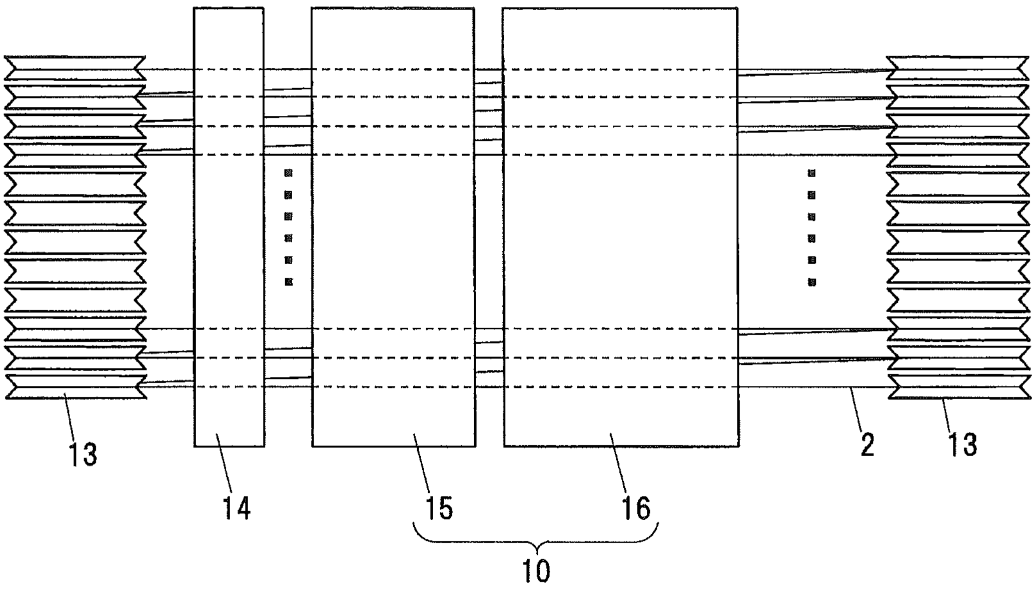
FIG. 2 is a top view showing the main parts of the manufacturing apparatus in FIG. 1.

FIG. 1 is an illustration diagram showing an example of an apparatus for manufacturing an enameled wire in the embodiment of the invention. FIG. 2 is a top view showing the main parts of the manufacturing apparatus in FIG. 1.

As shown in FIG. 1, a conductor 1 is sent to an annealing furnace 12 via pulleys 11 and is annealed. If unnecessary, the annealing may be omitted. The conductor 1 is then fed via a turning pulley 13 into a coating application unit 14 in which an enamel coating is applied to the outer periphery of the conductor 1.

The conductor 1 with the enamel coating applied thereto travels inside an evaporation oven 15 and a curing oven 16 which constitute a baking furnace 10, in which a solvent contained in the enamel coating is evaporated (i.e., the enamel coating is dried) and a resin contained in the enamel coating is then cured (i.e., a film is formed by baking).

As shown in FIG. 2, an enameled wire 2 returns to the upstream turning pulley 13 via the downstream turning pulley 13, so the application of the enamel coating, the evaporation of the solvent and the curing of the resin are repeated until obtaining a desired film thickness.

The method of curing the resin contained in the enamel coating is not specifically limited and the resin is cured by the heat of, e.g., hot air.

Meanwhile, as for the evaporation of the solvent contained in the enamel coating, the solvent contained in the enamel coating applied to the conductor 1 is evaporated in the evaporation oven 15 by exposure to light with a wavelength absorbable by the solvent and satisfying the condition that a peak wavelength is at less than 4 μm, as described above.

The peak wavelength is preferably within a range of 2.0 to 3.2 μm, more preferably from 2.2 to 3.1 μm, and further preferably from 2.3 to 3.0 μm.

The light irradiated on the conductor 1 with the enamel coating applied thereto preferably has a peak wavelength in the above-mentioned range, and it is further preferable that the light has no other peak wavelengths. By exposing the enamel coating on the conductor to light which is not absorbable by a resin as a solute and only absorbable by the solvent as a solvating medium, surface skinning of the enamel coating is suppressed and workability is improved. Although a curing reaction such as a cross-linking reaction of the resin contributes to the surface skinning of the enamel coating applied to the conductor, it is possible to inhibit the curing reaction of the resin by exposing the enamel coating to light with a wavelength absorbable only by the solvent so as not to heat the resin, and the skinning can be thereby suppressed. The exposure to the light absorbable only by the solvent also allows the solvent to be efficiently dried at low temperature. Thus, unlike the conventional technique, a drying temperature does not need to be increased when drying the enamel coating in a short time. This can prevent a foaming due to the boiling or bumping phenomenon of the solvent (i.e., the risk of foaming can be reduced), and the appearance of the film formed on the outer periphery of the conductor can be improved.

When using, e.g., N,N-dimethylacetamide (DMAc) as the solvent contained in the enamel coating (e.g., polyimide coating), N,N-dimethylacetamide (DMAc) is exposed to preferably light with a peak wavelength at around 2.3 μm (2.3±0.2 μm) or at around 3.0 μm (3.0±0.2 μm), more preferably light with a peak wavelength at 2.3 μm or 3.0 μm, further preferably light with a peak wavelength only at 2.3 μm or 3.0 μm since absorption peaks of MN-dimethylacetamide (DMAc) are in a region of less than 4 μm. Since a polyamic acid which is dissolved in the coating (and is transformed into polyimide after curing) only absorbs light with a wavelength of not less than 3.3 μm, it is possible to inhibit ring-closing reaction of the polyamic acid by selecting the light with the above-mentioned peak wavelength and the surface skinning of the enamel coating is thus less likely to occur.

The specific examples of the embodiment will be described below.

Figure 3A:
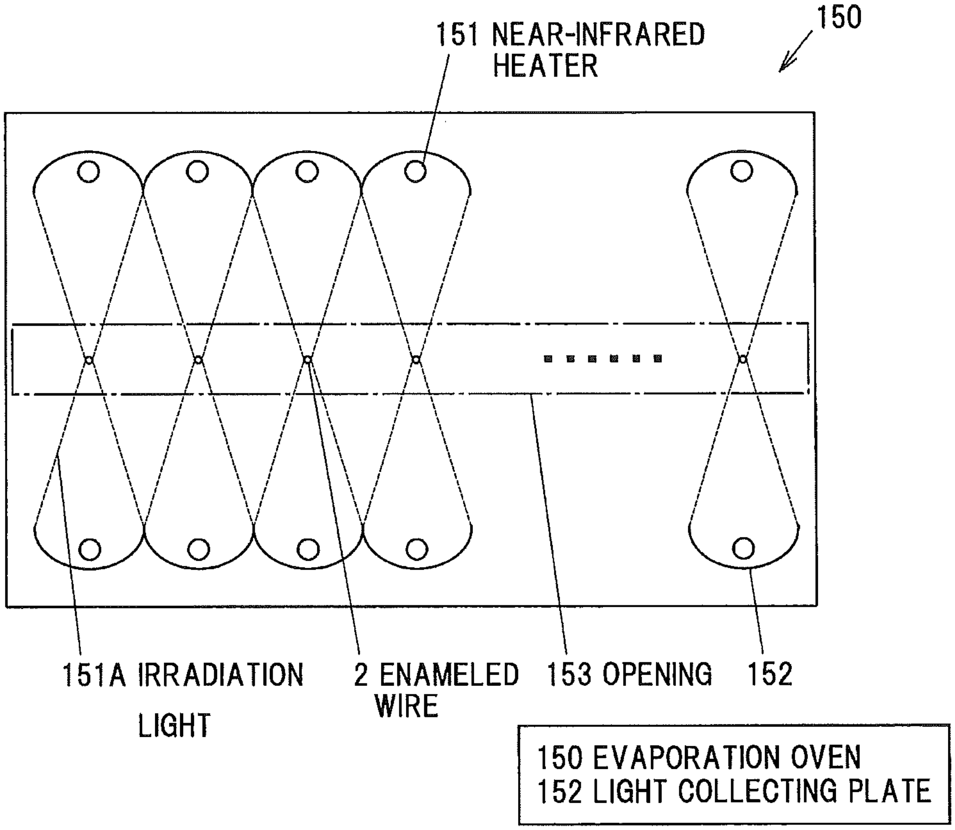
FIG. 3A is an illustration diagram (i.e., a cross sectional view perpendicular to the conductor feeding direction) showing one embodiment of an evaporation oven in FIG. 1.
Figure 3B:
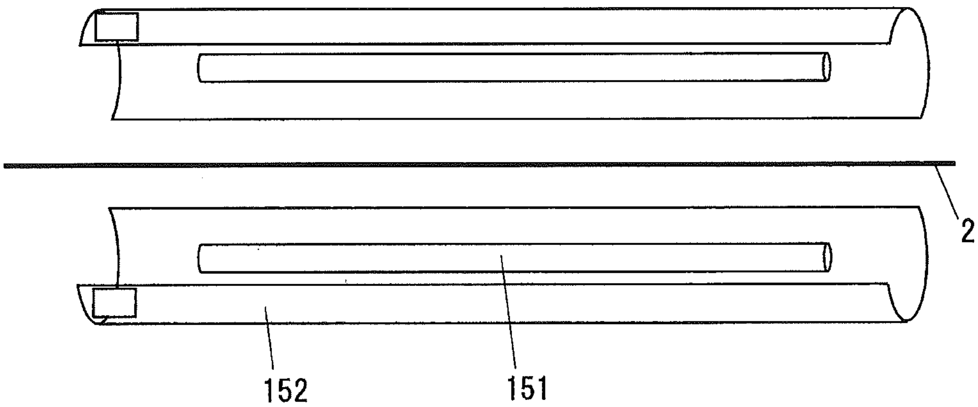
FIG. 3B is an illustration diagram (i.e., a side view parallel to the conductor feeding direction) showing a portion of the evaporation oven in FIG. 3A.

FIG. 3A is an illustration diagram (i.e., a cross sectional view perpendicular to the conductor feeding direction) showing one embodiment of the evaporation oven in FIG. 1 and FIG. 3B is an illustration diagram (i.e., a side view parallel to the conductor feeding direction) showing a portion of the evaporation oven shown in FIG. 3A.

An evaporation oven 150 as one embodiment of the evaporation oven is provided with near-infrared heaters 151 and light collecting plates 152 and is configured that the conductor 1 or the enameled wire 2 travelling through an opening 153 of the evaporation oven 150 is exposed to irradiation lights 151A which are near-infrared lights from the near-infrared heaters 151 collected by the light collecting plates 152.

Figure 4A:
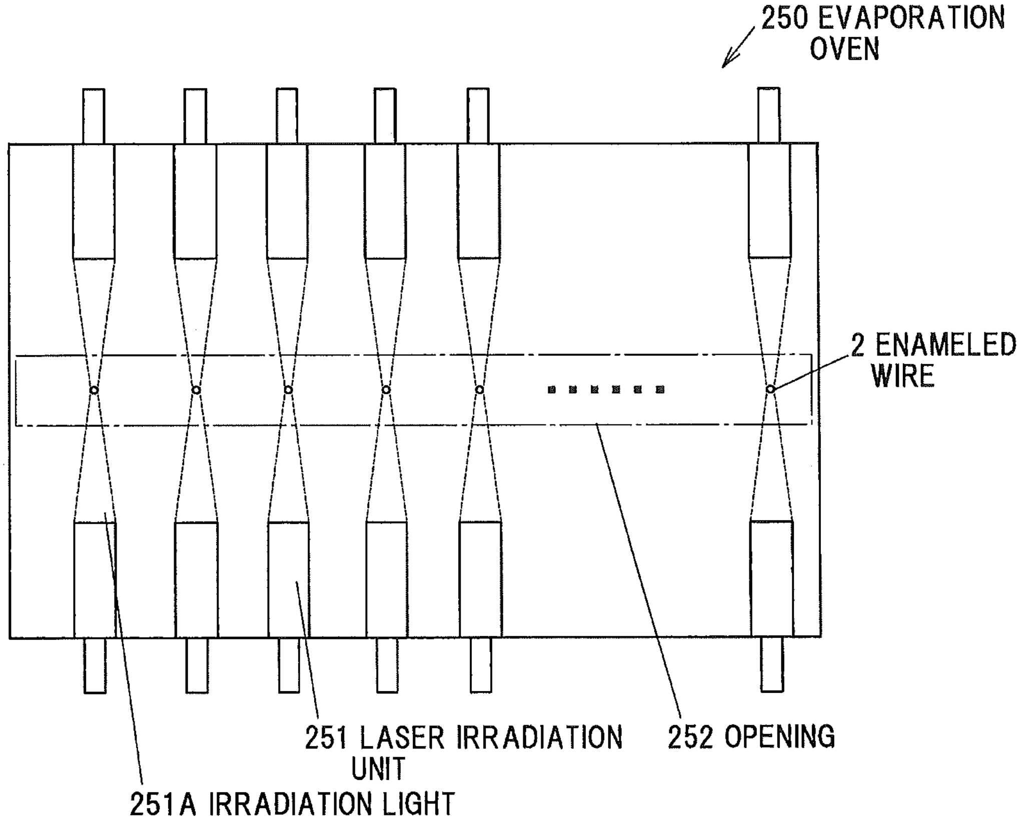
FIG. 4A is an illustration diagram (i.e., a cross sectional view perpendicular to the conductor feeding direction) showing another embodiment of the evaporation oven in FIG. 1.
Figure 4B:
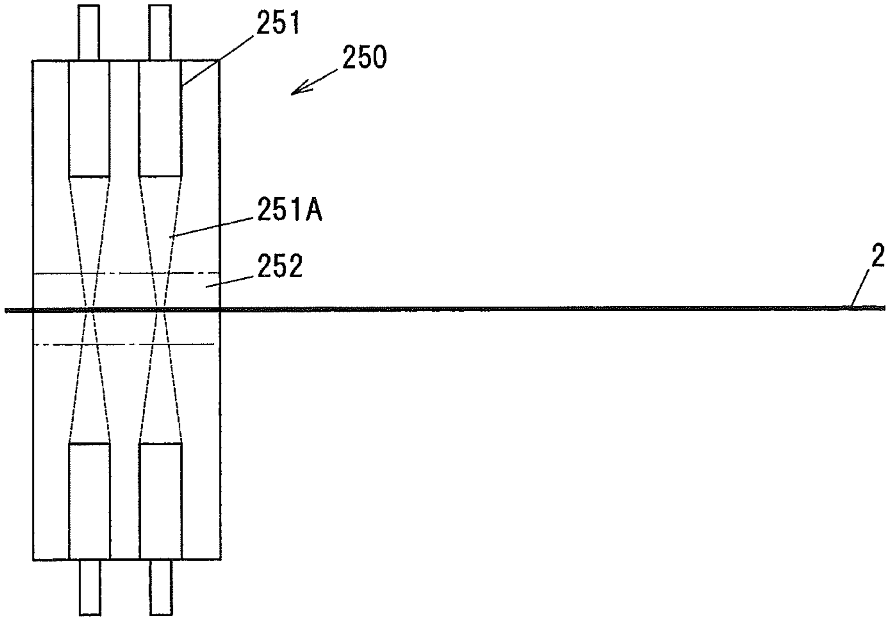
FIG. 4B is an illustration diagram (i.e., a cross sectional view parallel to the conductor feeding direction) showing the evaporation oven in FIG. 4A.

Meanwhile, FIG. 4A is an illustration diagram (i.e., a cross sectional view perpendicular to the conductor feeding direction) showing another embodiment of the evaporation oven in FIG. 1 and FIG. 4B is an illustration diagram (i.e., a cross sectional view parallel to the conductor feeding direction) showing the evaporation oven in FIG. 4A.

An evaporation oven 250 as another embodiment of the evaporation oven is provided with laser irradiation units 251 and is configured that the conductor 1 or the enameled wire 2 travelling through an opening 252 of the evaporation oven 250 is exposed to laser light (irradiation lights 251A) from the laser irradiation units 251.

The light source, which produces light with a wavelength absorbable by the solvent and satisfying the condition that a peak wavelength is at less than 4 μm, is not limited to the near-infrared heater or the semiconductor laser and may be, e.g., an LED (light-emitting diode), a high-intensity discharge lamp or an EL (electroluminescent) light.

Besides the near-infrared heater 151, a wavelength control heater which generates infrared light using a quartz tube and a tungsten filament and emits only near-infrared light after filtering far-infrared region by cooling can be used to irradiate near-infrared.

As the laser irradiation unit 251, it is preferable to use, e.g., a semiconductor laser irradiation unit.

Plural (e.g., twelve) near-infrared heaters 151 or laser irradiation units 251 are arranged in a direction perpendicular to the conductor feeding direction. The near-infrared heaters 151 having a length of 50 to 800 cm are provided each parallel to the conductor feeding direction such that the travelling conductor is sandwiched between each pair of facing near-infrared heaters 151 (one each above and below the travelling conductor in FIGS. 3A and 3B). Meanwhile, the laser irradiation units 251 are provided such that the travelling conductor is sandwiched between each pair of facing rows of plural (e.g., two) laser irradiation units 251 arranged in a direction parallel to the conductor feeding direction (two each above and below the travelling conductor in FIGS. 4A and 4B). The length and the number of the near-infrared heaters 151 and the number of the laser irradiation units 251 are not limited thereto and are appropriately determined.

The enameled wire 2 after baking is wound up on a winder 17.

The material of the conductor 1 used in the present embodiment is not specifically limited and may be, e.g., copper or copper alloy, etc. The shape of the conductor 1 is, e.g., round or rectangular, etc. The present embodiment is particularly advantageous for rectangular conductors as compared to the conventional method.

In case that an enamel coating is applied to a rectangular conductor, adhesion of a film is poor in the conventional method since it is not possible to dry the coating in a short time due to a low drying speed which causes a coating film (the enamel coating applied to the rectangular conductor) to flow, especially the enamel coating applied to corners of the rectangular conductor to flow down toward the peripheries of the corners, before being dried. That is, uniform film thickness is not obtained. In contrast, when using the method in the embodiment of the invention, it is possible to perform a drying process in a short time (and, in a preferred embodiment, at low temperature) and the coating thus can be dried in a state that the coating film is not flowing. Therefore, it is possible to prevent poor adhesion of the film. As such, since it is possible to increase a drying speed in the embodiment of the invention, the applied coating film is less likely to drip and it is thus possible to produce thick wires or rectangular wires with a film in good condition.

The enamel coating used in the present embodiment is not specifically limited as long as it can be used for manufacturing of enameled wires. Examples of the solvent contained in the enamel coating include N-methyl-2-pyrrolidone (NMP), cresol, N,N-dimethylacetamide (DMAc) and cyclohexanone, etc. Meanwhile, examples of the resin contained in the enamel coating include polyamide-imide, polyimide and polyester-imide, etc.

Apparatus for Manufacturing the Enameled Wire

The apparatus for manufacturing an enameled wire in the embodiment of the invention has a baking furnace provided with irradiation units for irradiating light having a peak wavelength in a region of less than 4 μm onto a travelling conductor with an enamel coating applied.

In the specific structural examples shown in FIGS. 1 to 4, the apparatus for manufacturing an enameled wire is provided with the baking furnace 10 to the winder 17.

Although the baking furnace 10 in the present embodiment is configured that the evaporation oven 15 and the curing oven 16 are separately provided and the irradiation units are installed in the evaporation oven 15, the baking furnace may be configured that the evaporation oven 15 and the curing oven 16 are integrated and the irradiation units are installed on the upstream side (the conductor entrance side) of the baking furnace. It is preferable to separately provide the evaporation oven 15 and the curing oven 16 as is the present embodiment to reduce the susceptibility to the cure treatment (hot air, etc.) in the curing oven 16. It is possible to form a film with better appearance by separately providing the evaporation oven 15 and the curing oven 16.

In addition, the baking furnace in the present embodiment is a horizontal furnace but may be a vertical furnace as is described in JP-A-2012-252868.

Effects of the Embodiment of the Invention

In the embodiment of the invention, it is possible to provide method and apparatus for manufacturing an enameled wire by which a film with good appearance can be formed even when a solvent contained in an enamel coating is evaporated in a short time to dry the enamel coating. Since it is possible to evaporate the solvent and to dry the enamel coating in a shorter time than the case of drying the enamel coating by hot air, etc., the production rate of the enameled wire increases and the manufacturing cost is reduced. In addition, it is possible to make the baking furnace smaller in length, thereby allowing an installation space for the manufacturing apparatus to be reduced. Furthermore, when drying the enamel coating, the solvent is vaporized by vibrating molecules of the solvent and is thus uniformly evaporated. Therefore, as compared to the case of using heat, it is possible to suppress foaming or skinning, etc.

It should be noted that the present invention is not intended to be limited to the embodiment and the various kinds of modifications can be implemented. For example, hot air (preferably low temperature and low wind speed) can be used concurrently in the evaporation oven 15 as long as the effects of the invention are obtained.

What is claimed is:

1. A method for manufacturing an enameled wire, the method comprising:

applying an enamel coating including a solvent and a resin on an electrical conductor;

evaporating the solvent included in the enamel coating, in a state of suppressing a surface skinning of the enamel coating, by exposing the enamel coating on the electrical conductor to a light, wherein the light is absorbed only by the solvent, and the light has a peak wavelength of 2.3±0.2 μm or 3.0±0.2 μm, thereby drying the enamel coating in a state of suppressing flowing of the enamel coating applied on the electrical conductor; and curing the resin included in the enamel coating after the evaporating of the solvent, wherein the applying of the enamel coating, the evaporation of the solvent in the enamel coating, and the curing of the resin in the enamel coating in this order constitute a cycle, and the cycle is conducted repeatedly to form from the enamel coating an enamel coating film with a predetermined thickness on the electrical conductor, thereby providing the enameled wire, wherein the solvent consists of N,N-dimethylacetamide (DMAc), and wherein the resin comprises polyamic acid and forms a polymide with the curing.

2. The method according to claim 1, wherein the light comprises a near-infrared light.

3. The method according to claim 1, wherein the light comprises a laser light.

4. The method according to claim 1, wherein the polyamic acid which is dissolved in the coating only absorbs light with a wavelength of not less than 3.3 μm.

5. A method for manufacturing an enameled wire comprising an electrical conductor with an enamel coating thereon, the method comprising:

applying the enamel coating including a solvent and a resin on the electrical conductor; and evaporating the solvent, in a state of suppressing a surface skinning of the enamel coating, by exposing the enamel coating on the electrical conductor to a light, wherein the light is absorbed only by the solvent, and the light has a peak wavelength of 2.3±0.2 μm or 3.0±0.2 μm, without curing the resin included in the enamel coating, thereby drying the enamel coating in a state of suppressing flowing of the enamel coating applied on the electrical conductor, wherein an enamel coating film with a predetermined thickness is formed by the applying of the enamel coating, the evaporating of the solvent in the enamel coating, and the curing of the resin in the enamel coating in this order constituting a cycle, and the cycle is conducted repeatedly to provide the enameled wire, wherein the solvent consists of N,N-dimethylacetamide (DMAc), and wherein the resin comprises polyamic acid and forms a polyimide with curing of the resin after the evaporating.

6. The method according to claim 5, wherein the polyamic acid which is dissolved in the coating only absorbs light with a wavelength of not less than 3.3 μm.

* * * * *